United States Patent Office 3,746,684
Patented July 17, 1973

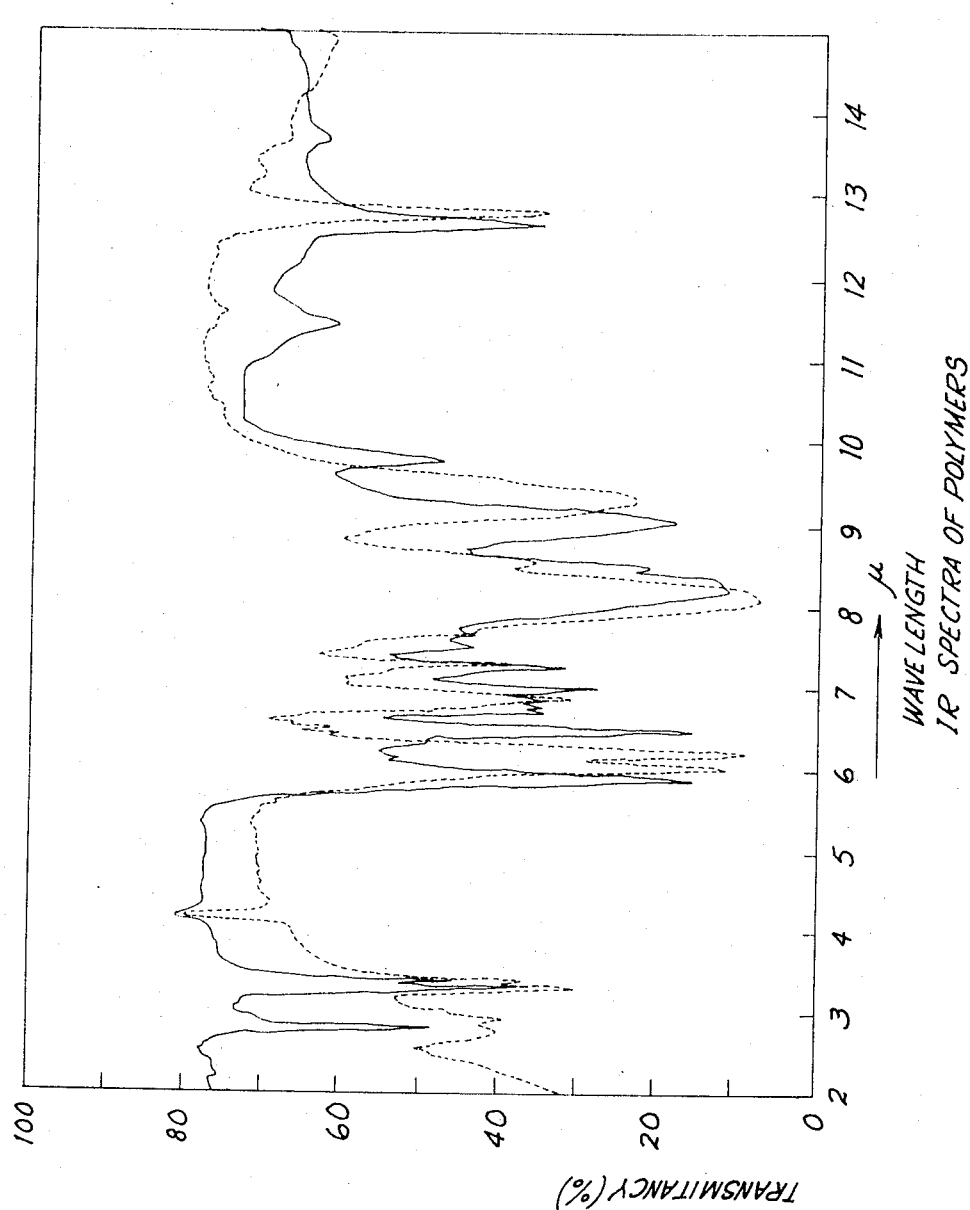

3,746,684
POLY-[IMINO(2,5-DIALKOXYCARBONYL-1,4-PHENYLENE)IMINOARYLENE]
Kazuo Adachi, Akira Tai, Fukuji Higashi, and Katsuya Shibata, Tokyo, Japan, assignors to Tekkosha Co., Ltd., Tokyo, Japan
Filed Oct. 18, 1971, Ser. No. 189,877
Claims priority, application Japan, Oct. 20, 1970, 45/91,667
Int. Cl. C08g 17/02, 33/06
U.S. Cl. 260—47 CP                                    6 Claims

ABSTRACT OF THE DISCLOSURE

A new high polymer comprising recurring structural units of the formula

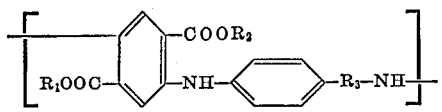

and additionally recurring structural units of the formula

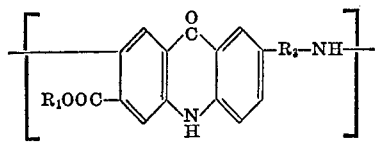

is obtained by oxidation of high polymer comprising recurring structural units of the formula

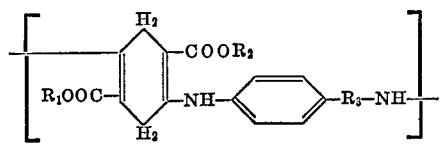

which may be obtained from a reaction between dialkyl succinyl-succinates and aromatic diamines. The new high polymer is a heat resistant resin being characterized by spectroscopic absorption IR spectra at the vicinities of 2.59, 5.92, 6.38, 6.50, 6.55, 9.10, 9.50, 11.5 and 12.7$\mu$. It can be used to make films, sheets, coatings for metals and as various shaped moldings

BACKGROUND OF THE INVENTION

Field of the invention

This invention relates to a new high polymer which is obtained by the oxidation of high polymer comprising recurring structural units of the formula

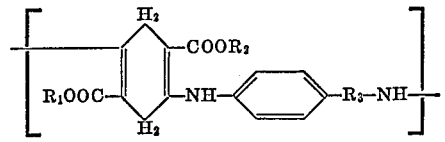

wherein $R_1$ and $R_2$ represent $C_1$–$C_4$ alkyl radicals, $R_3$ represents an aromatic divalent radical of phenylene derivative, preferably a member selected from the group consisting of

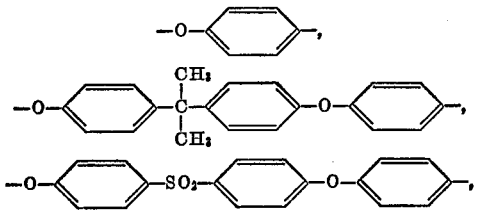

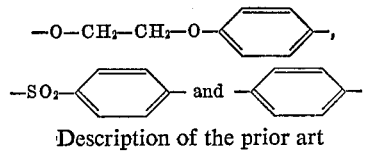

Description of the prior art

Heretofore, there has been known the high polymer, hereinafter sometimes referred to as Polymer II, comprising recurring structural units of the formula

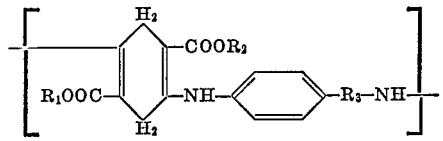

(S. Kimura, Macromol., Chem., 117, 203 (1968)).

SUMMARY OF THE INVENTION

A main object of this invention is to provide a new high polymer hereinafter sometimes referred to as Polymer I comprising recurring structural units of the formula

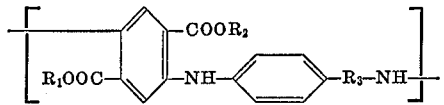

wherein $R_1$ and $R_2$ represent $C_1$–$C_4$ alkyl radicals, $R_3$ represents an aromatic divalent radical of phenylene derivative, preferably a member selected from the group consisting of

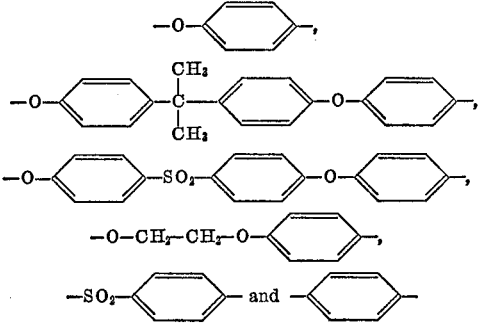

Another object of this invention is to provide a new high polymer comprising recurring structural units of the formula

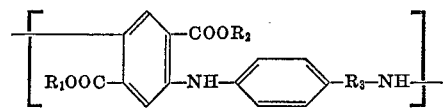

and further recurring structural units of the formula

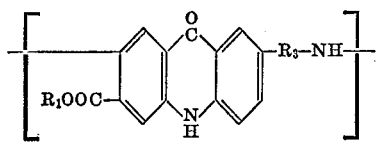

wherein $R_1$, $R_2$ and $R_3$ have the same meaning as above.

A further object of this invention is to provide a process for preparing the new high polymer by oxidizing a high polymer obtained by condensation between succinyl succinates and aromatic diamines.

A still further object of this invention is to provide a new high polymer which shows good resistance to heat, acids and alkalies, as well as to dielectric breakdown, and has excellent properties of strong adhesion, good electric insulation and the like.

BRIEF DESCRIPTION OF THE DRAWING

The drawing shows an absorption IR spectrum of a typical polymer of this invention which is obtained by oxidizing with air the polymer derived from the reaction between diethyl succinylsuccinate and 4,4'-diaminodiphenyl-ether (the first polymer is hereinafter refered to as Polymer $I_1$ and the second as Polymer $II_1$), together with that of Polymer $II_2$. The solid line shows the IR spectrum of Polymer $I_1$ and the dashed line shows that of Polymer $II_1$.

DETAILED EXPLANATION OF THE INVENTION

The high polymer, Polymer I, of this invention shows characteristic IR absorptions at the vicinities of 2.59, 5.90, 6.50, 9.10, 11.5 and 12.7μ. As is obviously recognized from the spectra in the drawing, the characteristic IR absorptions of Polymer $II_1$ at 6.25 and 6.09μ, which are due to the stretching of double bond of cyclohexadiene skelton and to the stretching of carbonyl being greatly shifted to longer wavelength by the effect of the conjugation with the double bond and further of hydrogen bonding with amine radical, respectively, disappear in the Polymer $I_1$. Instead of these, the IR absorptions at 5.90 and 11.5μ appear and these are due to the stertching of carbonyl in the ester of aromatic carboxylic acids and to the stretching of the aromatic double bond in tetra-substituted benzene skeleton, respectively.

The Polymer I of the present invention also show the absorption of IR spectrum at 2.59, 6.50, 9.10 and 12.7μ as mentioned above. Therefore, it is confirmed that the Polymer I of this invention comprises recurring structural units of the formula

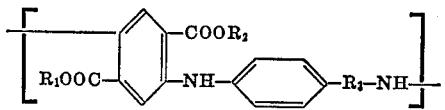

Furthermore, in the IR spectrum of Polymer I, when the oxidation of Polymer II is carried out at an elevated temperature the characteristic IR absorptions due to acridone structure are observed at 6.38, 6.55 and 9.50μ. Therefore, it is obviously recognized that the Polymer I prepared under such a condition further comprises recurring structural units including acridone ring of the formula

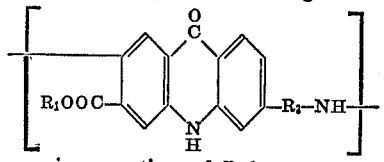

The conversion reaction of Polymer II to Polymer I can be explained in the case, for example, of Polymer $II_1$ by the following equations;

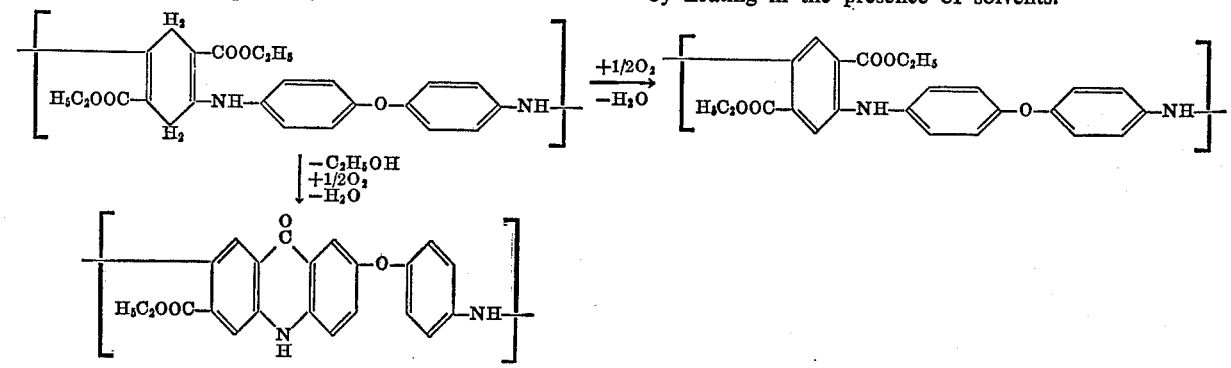

The Polymer II is converted to Polymer I of this invention by the oxidation of the cyclohexadiene ring in the recurring structural units to a benzene ring and at the same time the ring closure reaction occurs to form an acridone structure by the dealcoholation reaction. These two reactions occur concurrently, but since the reaction velocity of the oxidation reaction is much greater than that of the ring closure reaction, the ratio of the recurring structural units including the acridone ring is usually 5-10% to the overall recurring structural units. This value can be estimated by measuring the quantitatively released water and alcohol according to the aforementioned reaction processes. It is concluded that the said ring closure reaction hardly occurs subsequent to the oxidation reaction.

The afore-mentioned reaction processes were confirmed by analyzing the results obtained from such techniques as absorption IR spectroscopy, differential thermal analysis and the analysis using a thermal balance, and also by tracing the condensation reaction using diethyl succinyl-succinate and aniline as the model compounds. That is, the Polymer II is converted by heating in the air to the copolymer, Polymer I of this invention, whereby the cyclohexadiene skeleton is oxidized to benzene ring accompanying the partial dealcoholation reaction for forming acridone ring.

The starting material, Polymer II of this invention, can be easily obtained by the condensation reaction between dialkyl succinyl-succinates of the formula

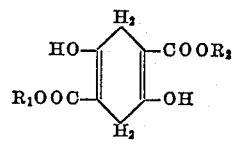

(wherein $R_1$ and $R_2$ represent $C_1$–$C_4$ lower alkyl radicals) and diamines of the formula

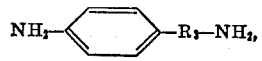

wherein $R_3$ represents an aromatic divalent radical of phenylene derivative, preferably a member selected from the group consisting of

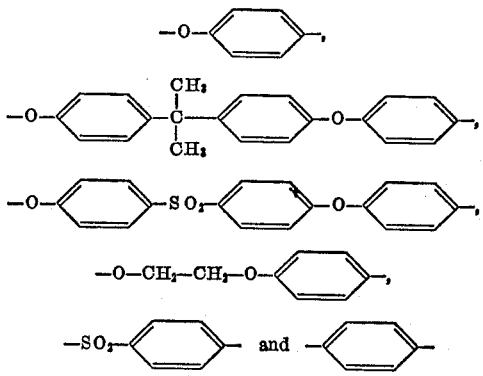

by heating in the presence of solvents.

The high polymer, Polymer I of this invention, is obtained by oxidizing the thus obtained starting material high Polymer II. The Polymer II may be applied in the form of a solution onto metal goods such as copper, silver, gold, iron, aluminum or tin, and then oxidized by heating in the air. The oxidation may also be carried out by heating the starting material high Polymer II in the state of powder, film or molding in air, or in the state of a suspension thereof in the presence of an oxidizing agent. A temperature of 80–250° C. preferably 150–200° C., is employed for the heating.

No appreciable change is observed in the new heat-resistant resin, Polymer I of this invention, after severe heating at 180° C. for 1 week and also at 600° C. for a moment.

This resin shows a good durability for alkalis, as illustrated by the fact that no appreciable changes were observed even when it was contacted with molten metallic sodium or hot potassium hydroxide solution.

These are excellent properties of the resin, Polymer I, of this invention which have not been obtained in traditional resins produced by the poly-condensation reaction.

Said resin has also a good durability for solvents, and no appreciable change has been observed after immersion for 1 week in ethyl acetate, ethanol, trichloroethylene, m-cresol, toluene, transformer-oil #2 or the like.

Said resin has superior electric properties, of which typical values are listed as follows:

Volume resistance _____Ω-cm__ $10^{15}$
Dielectric loss _____ [1] $1.2 \times 10^{-3}$
Dielectric constant _____ [1] 1.9
Electric break-down voltage _____kv./mm__ 92

[1] At 1 kHz.

PREFERRED EMBODIMENT OF THE INVENTION

This invention is further illustrated by the following nonlimitative examples. Hereinafter, the term "part" represents weight part and the measurements of the dielectric properties were carried out at 1 kHz.

EXAMPLE 1

A polymerization reaction was carried out by heating a solution of 2.56 parts of diethyl succinylsuccinate and 2.00 parts of 4,4'-diamino diphenyl ether in 60 parts of dimethyl formamide at 120° C. for 7 hours in a nitrogen atmosphere. The resulting viscous liquid was cooled to room temperature, then poured into 120 parts of water to form a dispersion of the product. The yellow polymer powder was obtained by filtering the dispersion, washing and drying the filtrate. This yellow polymer which shows the characteristic IR-absorption spectrum inherent to the Polymer II as illustrated in the drawing is determined to be Polymer II₁ comprising recurring structural units of the formula

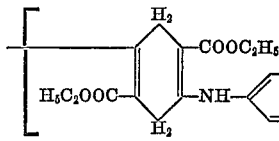

This polymer is cast on a glass plate by applying a 30% solution thereof in cyclohexanone to form a resin film on the plate. The film was maintained at 120° C. for 1 hour under ventilation, and then stripped off from the plate. The film was fixed between metal flamings and heated further at 200° C. for another 1 hour to obtain a dark red flexible film.

This finally obtained film showed a absorption IR-spectrum as illustrated by the solid line in the drawing, which has the characteristic IR-absorptions at 2.59, 5.92, 6.50, 9.10, 12.7, 6.38 and 6.55μ, and is determined to be Polymer I.

The physical properties of the film are as follows;

Elongation strength _____kg./mm.² __ 11.5
Elongation _____percent__ 5.5
Volume resistivity _____Ω-cm__ $1.02 \times 10^{15}$
Dielectric loss _____ $1.2 \times 10^{-3}$
Dielectric constant _____ 1.82
Dielectric break-down voltage ____kv./mm__ 92

Example 2

The 30% solution of the Polymer II₁ in cyclohexanone obtained in Example 1 was cast onto an aluminum plate. Evaporation of the solvent and curing at 180° C. for 2 hours under ventilation gave a resin film of the Polymer I₁ tightly adhered to the aluminum plate.

The electric properties of the finally obtained resin film were substantially same as in the Example 1. The hardness measured by the pencil scratch test was 3H. No appreciable break-down of the resin film was observed on Mandrel-bending test using 5 mm. diameter cylinders in which the aluminum plate bearing the adhered resin film was bent around on the cylinder.

No appreciable stripping of the cross cut section of the film in 10 x 10 sections thereof was observed on cross cut tape test in which the square cut sections of the resin film of 1 mm.² was pulled by an adhering tape stuck on the cross cut resin film.

Example 3

A polymerization reaction of 5.12 parts of diethyl succinylsuccinate with 8.20 parts of 2,2-bis-[4-(4-aminophenoxy)phenyl] propane and the isolation of the resulting polymer was carried out in the similar way as in Example 1 to give powder of a Polymer II comprising recurring structural units of the formula

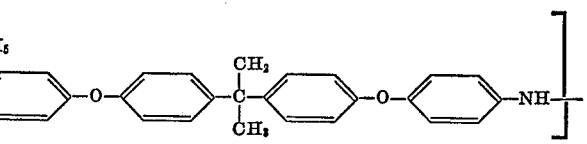

Polymer II as illustrated in the drawing is determined to be Polymer II₁ comprising recurring structural units of the formula

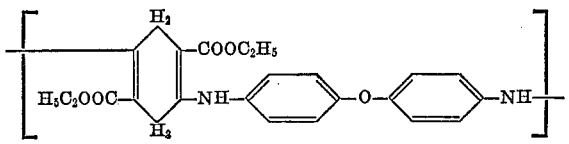

This polymer is cast on a glass plate by applying a 30% solution thereof in cyclohexanone to form a resin The polymer film obtained in the similar way as in Example 1 from the polymer solution which is prepared by dissolving 20 parts of the above resulting powder in 80 parts of m-cresol, was fixed in a metal framing. Then the film was heated 180° C. for 2 hours.

The resulting dark red and flexible film had IR absorptions at 2.59, 5.92, 6.50, 9.10, 12.7, 6.38 and 6.55μ. It was confirmed that the film consists of a Polymer I comprising recurring structural units of the formula

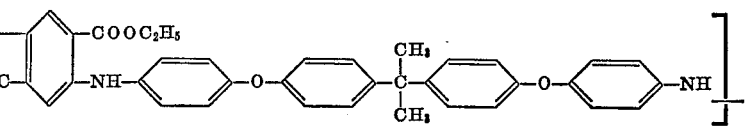

and further recurring structural units of the formula

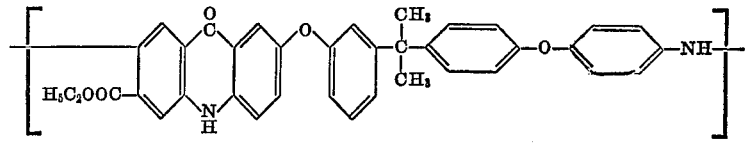

The physical properties of this Polymer I film were as follows;

| | | |
|---|---|---|
| Elongation strength | kg./mm.² | 9.5 |
| Elongation | percent | 9.5 |
| Volume resistivity | Ω-cm | $10^{15}$ |
| Dielectric loss | | $1.2 \times 10^{-3}$ |
| Dielectric constant | | 1.9 |
| Dielectric break-down voltage | kv./mm | 92 |

Example 4

A polymerization reaction of 2.56 parts of diethyl succinyl-succinate with 4.32 parts of di-[4-(4-aminophenoxy)] phenyl sulphone and the isolation of the resulting Polymer II was carried out in the similar way as in Example 1. From the resulting polymer a film of the Polymer I comprising recurring structural units of the formula

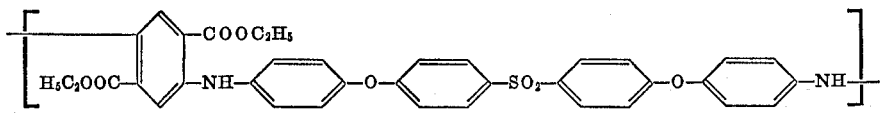

and further recurring structural units of the formula

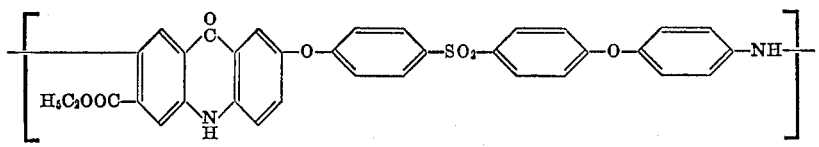

was obtained in the similar way as in Example 1.

The physical properties of the finally resulting film were as follows;

| | | |
|---|---|---|
| Elongation strength | kg./mm.² | 10.5 |
| Elongation | percent | 14 |
| Volume resistivity | Ω-cm | $10^{15}$ |
| Dielectric loss | | $1.2 \times 10^{-3}$ |
| Dielectric constant | | 2.0 |
| Dielectric break-down voltage | kv./mm | 89 |

Example 5

A cast film of a Polymer II comprising recurring structural units of the formula

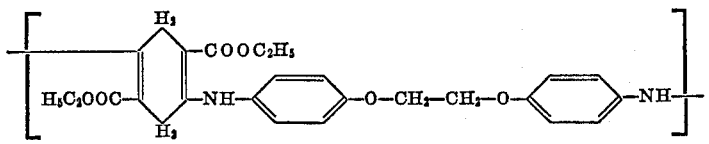

on an aluminum plate was prepared from 1.04 parts of dimethyl succinyl-succinate and 1.22 parts of ethyleneglycol bis(4-amino phenyl) ether in the similar way as in Example 1.

A resin film of the Polymer I comprising recurring structural units of the formula

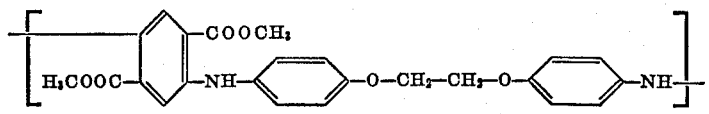

and further recurring structural units of the formula

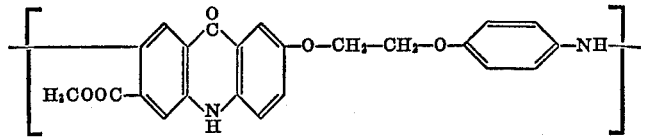

was obtained by heating the cast film of the Polymer II in air at 200° C. for 1 hour. Electric properties of the finally obtained resin film were as follows:

| | | |
|---|---|---|
| Volume resistivity | Ω-cm | $1 \times 10^{15}$ |
| Dielectric loss | | $1.3 \times 10^{-3}$ |
| Dielectric constant | | 2.2 |
| Dielectric break-down voltage | kv./mm | 89 |

Example 6

A 30% solution of a Polymer II in cyclohexanone, said Polymer II comprising recurring structural units of the formula

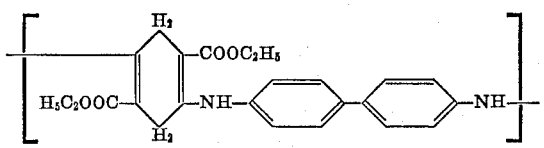

was prepared from 1.28 parts of diethyl succinyl succinate and 0.92 part of benzidine in the similar way as in Example 1. This solution was doctored onto an iron plate to form a resin film in the similar way as in Example 2, which was subsequently heated in the air at 200° C. for 1 hour resulting in a resin film of a Polymer I comprising recurring structural units of the formula

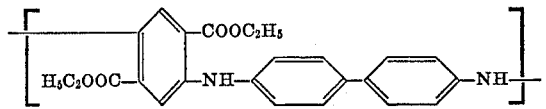

and recurring structural units of the formula

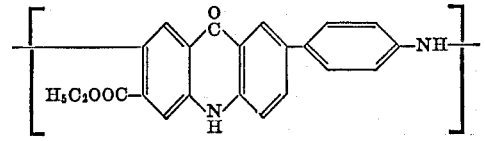

Electric properties of the finally obtained resin film were as follows:

| | | |
|---|---|---|
| Volume resistivity | Ω-cm | $1.1 \times 10^{15}$ |
| Dielectric loss | | $1.4 \times 10^{-3}$ |
| Dielectric constant | | 2.0 |
| Dielectric break-down voltage | kv./mm | 90 |

Example 7

A solution of a Polymer II comprising recurring structural units of the formula

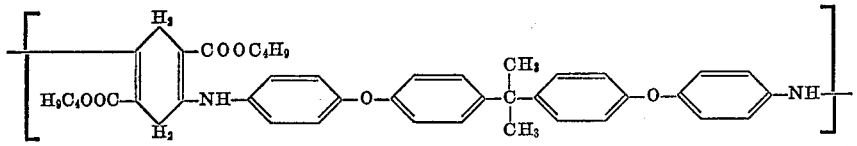

was prepared from 3.12 parts of dibutyl succinyl-succinate and 4.10 parts of 2,2-bis[4-(4-aminophenoxy)phenyl]propane in the similar way as in Example 1. This solution was doctored onto an iron plate to form a resin film in the similar way as in Example 2, which was subsequently heated in the air at 200° C. for 0.5 hour resulting in a resin film of a Polymer I comprising recurring structural units of the formula

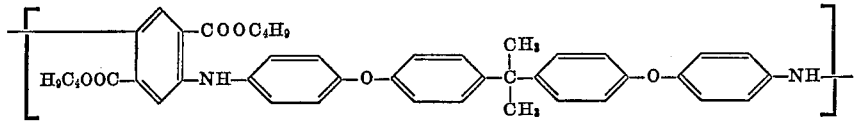

and further recurring structural units of the formula

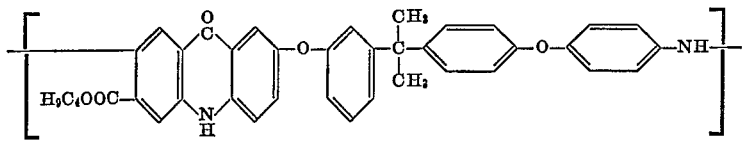

Electric properties of the finally obtained resin film were as follows:

Volume resistivity ................Ω-cm__ $1.1 \times 10^{15}$
Dielectric loss ...... ....................... $1.3 \times 10^{-3}$
Dielectric constant ....................... 2.1
Dielectric break-down voltage ____kv./mm__ 91

Example 8

A polymerization reaction of 5.12 parts of diethyl succinyl succinate and 4.96 parts of 4,4'-diaminodiphenyl sulfone, both dissolved in 120 parts of dimethyl formamide, was carried out in nitrogen atmosphere in the similar way as in Example 1 to form a Polymer II comprising recurring structural units of the formula

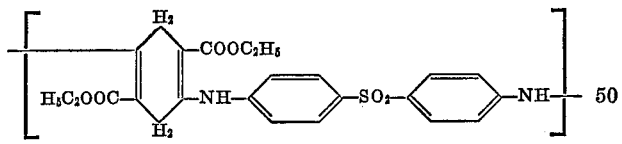

The Polymer II solution was prepared in the same manner as in Example 1. The solution was doctored onto an aluminum plate in the same manner as in Example 2, which subsequently heated in air at 200° C. for 1 hour resulting in a resin film of a Polymer I comprising recurring structural units of the formula

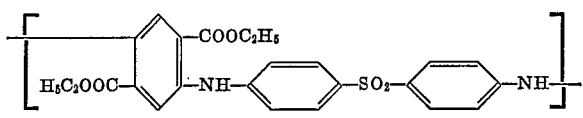

and further recurring structural units of the formula

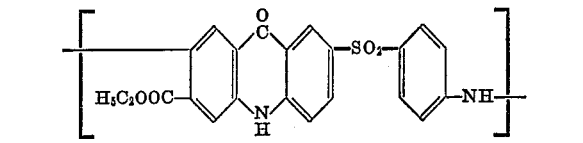

Physical properties of the finally obtained resin film were as follows:

Mandrel-bending test: No appreciable break-down of the film was observed on 5 mm. diameter cylinder Cross cut tape test: No appreciable stripping of cross cut sections of the film was observed
Volume resistivity: $1.2 \times 10^{15}$ Ω-cm.

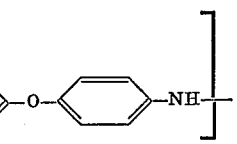

Dielectric loss: $1.2 \times 10^{-3}$
Dielectric constant: 2.0
Dielectric break-down voltage: 90 kv./mm.

The Mandrel-bending test and the cross cut tape test were carried out in the same manner as in Example 2.

We claim:
1. A film-forming polymer which consists essentially of

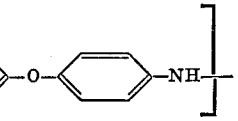

recurring structural units of the formula

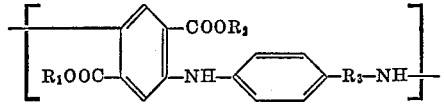

wherein $R_1$ and $R_2$ are alkyl radicals having from 1 to 4 carbon atoms, and $R_3$ is a divalent radical selected from the group consisting of

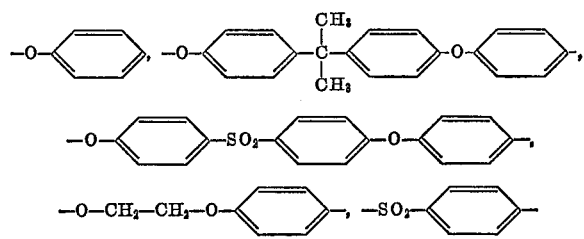

and

2. A film-forming polymer which consists essentially of from about 5% to about 10% of recurring structural units of the formula

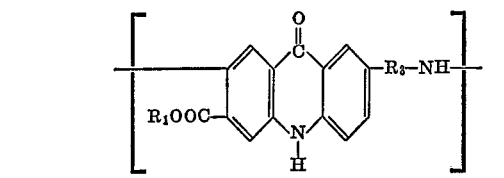

and the balance is recurring structural units of the formula

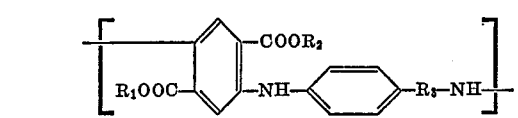

wherein $R_1$ and $R_2$ are alkyl radicals having from 1 to 4 carbon atoms, and $R_3$ is a divalent radical selected from the group consisting of

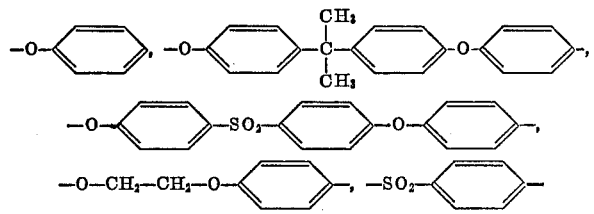

and

3. A process for preparing a polymer which comprises oxidizing with an oxidizing agent at a temperature of 80 to 250° C. a first polymer consisting essentially of recurring structural units of the formula

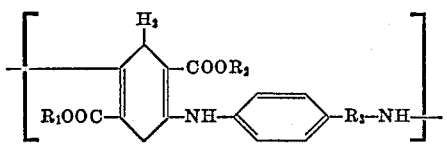

until there is formed a substantial amount of a second polymer consisting essentially of recurring structural units of the formula

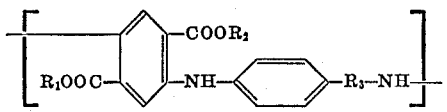

wherein $R_1$ and $R_2$ are alkyl radicals having from 1 to 4 carbon atoms, and $R_3$ is a divalent radical selected from the group consisting of

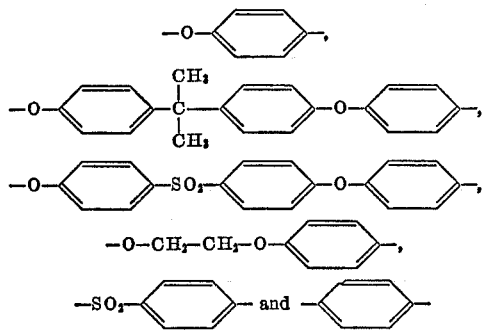

4. The process according to claim 1, wherein a film of the first polymer is oxidized, thereby producing a film of the second polymer.

5. The process according to claim 1, wherein the first polymer is a polymer obtained by a polymerization reaction between a succinyl succinate of the formula

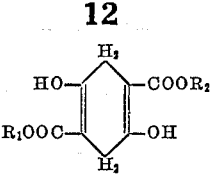

and a diamine of the formula

wherein $R_1$ and $R_2$ are radicals selected from the group consisting of methyl, ethyl, propyl and butyl, and $R_3$ is a radical selected from the group consisting of

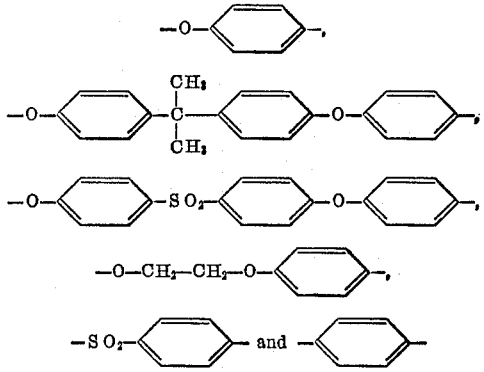

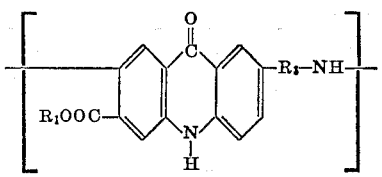

6. The process according to claim 3, wherein the second polymer further contains from about 5% to about 10% of recurring structural units of the formula

[structure]

and the oxidation is carried out at an elevated temperature.

References Cited
UNITED STATES PATENTS 3,426,044   2/1969   Sparks et al. _____ 260—346.6
3,635,888   1/1972   Adachi et al. _____ 260—47

WILLIAM H. SHORT, Primary Examiner
L. L. LEE, Assistant Examiner

U.S. Cl. X.R.

117—124 E, 132 B; 260—32.6 N, 32.8 N, 334 P, 49, 65, 78 TF